Oct. 28, 1952     P. I. KISSICH     2,615,276
BOBBER
Filed July 31, 1948
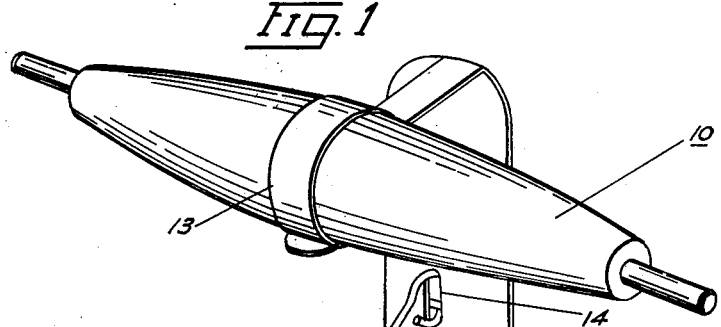
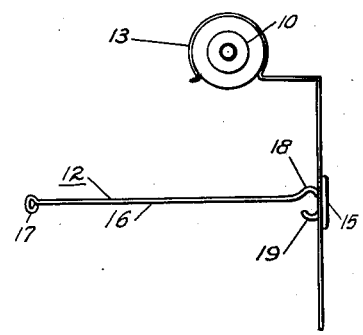
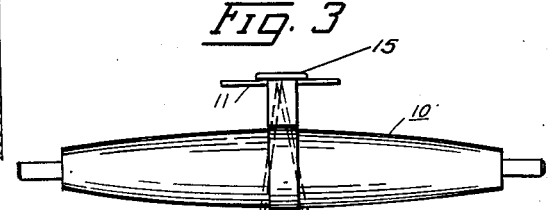
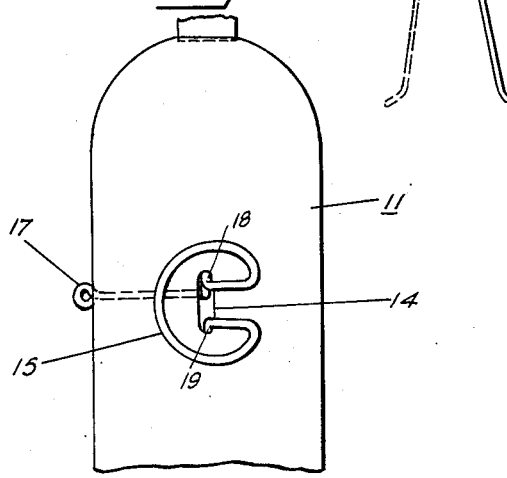
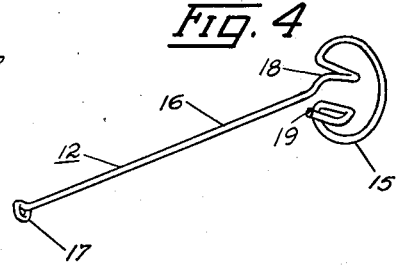
INVENTOR.
PETER I. KISSICH
BY
*Flournoy Corey*
ATTORNEY.

Patented Oct. 28, 1952

2,615,276

UNITED STATES PATENT OFFICE 2,615,276

BOBBER

Peter I. Kissich, Cedar Rapids, Iowa

Application July 31, 1948, Serial No. 41,769

5 Claims. (Cl. 43—43.13)

This invention relates to fishing tackle and has particular relation to a bobber which can be used in running water to carry the bait or line to a position at either side of its normal direction of movement.

In some types of fishing, particularly trolling and stream fishing, the relative motion of the water and the fisherman determines the position of the bait or lure. For example, in trolling, it is customary for the fisherman to let his line trail behind the boat, extending back to a considerable distance. Under these circumstances the line tends to take a position parallel to the direction of movement of the boat. When several fishermen are fishing from the same boat, all of their lines tend to draw together directly behind the boat and frequently become entangled. If the lines do not become entangled, they are still in the most turbulent area just behind and in the wake of the boat.

Somewhat the same condition exists in stream or river fishing. In this type of fishing it is frequently the practice to cast from the bank. The lure is then permitted to drift downstream, but at the same time it drifts towards the bank on which the fisherman is positioned. The fisherman must withdraw his line and recast before the lure comes near the bank or risk entanglement along the bank. During each cast, there is only a limited time during which the lure can be kept in an area suitable for fishing.

It is an object of my invention to provide a bobber which will carry a fishing line to either side of its normal direction of movement in running water.

Another object of my invention is to provide a bobber in which the direction of movement can be predetermined by the user.

A still further object of my invention is to provide a bobber in which the degree of deflection from the normal can be predetermined by the user.

Other and further features and objects of the invention will be more apparent to those skilled in the art upon a consideration of the accompanying drawings and following specification, wherein is disclosed a single exemplary embodiment of the invention, with the understanding, however, that such changes may be made therein as fall within the scope of the appended claims, without departing from the spirit of the invention.

In said drawings:

Figure 1 is a view in perspective of a bobber constructed according to one embodiment of my invention.

Figure 2 is a side view of the device shown in Figure 1.

Figure 3 is a top view of the device shown in Figure 1, showing possible alternate positions of the towing portion thereof.

Figure 4 is a view in perspective of the towing portion of the device shown in Figure 1, and Figure 5 is a partial end view of the device showing the relation of the base of the towing member to the deflection member.

Referring now more particularly to Figure 1, wherein is shown a bobber constructed according to one embodiment of my invention; in this embodiment, the bobber is composed of three main portions, a float member 10, a deflector member or plate 11, and a tongue member 12.

Referring now more particularly to the deflector member 11, as shown in some detail in Figures 1 and 5, it will be noted that it is composed of a thin elongated portion of metal or some other suitable material. In the center of the deflector member is a small elongated opening 14 which is provided to receive the attaching means 15 of the tongue member 12. At one end of the elongated deflector member or plate 11 is a hook member 13. The hook member 13 is provided to receive the float member 10.

The float member 10 is composed of cork or some other suitable buoyant material. In the embodiment shown, the float member is of substantial length in relation to the width of the deflector member or plate 11. The hook member 13 is so formed that the long float member is held at a distance from and parallel to the deflector member or plate 11.

In the embodiment shown, the tongue member 12 is composed of three main portions, the attaching means, comprising a loop 15 and locking means 18 and 19, a shank 16, and the eye 17 which receives the fishing line.

The entire tongue member 12 may be formed out of one piece of wire or the like. One end of the wire is formed into a loop 15, leaving one short stub 19 and a much longer portion 16, which serves to form the shank. Both the stub 19 and the shank 16 are bent upwardly and outwardly from the plane formed by the loop. Both the short stub 19 and the shank 16 are so formed as to describe an acute angle in relation to the loop 15, as shown in Figure 3. The stub 19 and the lower portion of the shank 16 at 18 are bowed outwardly to such an extent that their outside distances exceed the length of the elongated opening 14 in the deflector member or plate 11 to form a locking means. The shank 16 terminates in an eye 17 which is small enough to be passed through the opening 14 in the deflector member or plate.

In practice, the eye 17, shank 16, and locking means 18 and 19 are passed through the deflector member or plate opening 14. When the tongue member is in position, the locking means hold the loop 15 firmly against the back of the deflector member or plate. In this way the deflector member or plate is held at an acute angle to the shank of the tongue member. It will be noted that the tongue member may be inserted in the deflector member or plate in two alternate positions, as shown in Figure 3.

From the foregoing description, the nature of the operation of the device will be readily apparent. When the line is attached at the eye 17 and the device placed in running water, the entire unit will be in a trailing position. The deflector member or plate 11 and the float 10 will then be at an angle to the direction of movement. When the water strikes the deflector member or plate and float an angular force will tend to move the unit and its attached fishing line to one side or the other, depending on the position of the tongue member 12. It will also be further apparent that the degree of the acute angle may be varied at will by bending the shank portion 16 slightly in either direction. In practice, a wide variety of positions can be established.

In use, a device of the nature described will make it possible to keep the bait or lure in many different positions in running water, regardless of the position of the fisherman. In stream fishing, the line may be held out in the running water and away from the bank. In trolling, the line may be carried well to one side of the boat. Several fishermen in the same boat may keep their individual lines well separated and away from the boat's wake.

It will be noted, from the foregoing description, that I have provided a simple, inexpensive bobber which, when used in running water, will carry the fishing line to one side or the other of its normal direction of movement.

Although I have described a specific embodiment of my invention, it is apparent that modifications thereof may be made by those skilled in the art. Such modifications may be made without departing from the spirit and scope of my invention as set forth in the appended claims.

I claim as my invention:

1. In a bobber, a substantially rectangular deflector plate, an elongated float member mounted in conjunction with said deflector plate, and a stiff shank member mounted in the center of said deflector plate and positioned to form an acute angle in relation thereto.

2. In a bobber, a deflector plate having an opening therein, a tongue member comprising an eye, a shank, a loop, and a locking means, said loop and locking means being adapted to engage the opening in the deflector plate, and a float member attached to said deflector plate.

3. In a bobber, a stiff tongue member having a loop formed at one end thereof, a deflector plate adapted to rest on said loop, locking means forming part of said loop for holding said deflector plate against said loop, and a float member attached to said deflector plate.

4. In a bobber, a tongue member having a shank, one end thereof being formed into a loop, said loop being so positioned that the plane formed thereby is at an acute angle in relation to the shank, a deflector plate adapted to engage said loop in a plane substantially parallel to the plane of the loop, and means for attaching a float to said deflector.

5. A fishing float comprising a deflector plate, a float, a mounting securing the float to and adjacent the top of the plate mounted adjacent the top thereof, and a stiff deformable shank independent of the mounting and affixed to and extending outwardly at an angle to the face of the deflector plate, the said shank having an eye at its outer end.

PETER I. KISSICH.

REFERENCES CITED

The following references are of record in the file of this patent:

UNITED STATES PATENTS

| Number | Name | Date |
|---|---|---|
| 1,220,921 | Wilson | Mar. 27, 1917 |
| 1,232,211 | Burkman | July 3, 1917 |
| 1,542,404 | Paulson | June 16, 1925 |
| 2,255,465 | Hickey | Sept. 9, 1941 |